United States Patent
Usui et al.

(10) Patent No.: US 7,612,936 B2
(45) Date of Patent: Nov. 3, 2009

(54) OPTICAL AMPLIFYING APPARATUS FOR WAVELENGTH DIVISION MULTIPLEXED SIGNALS

(75) Inventors: Kaoru Usui, Kawasaki (JP); Yoshio Shimano, Kawasaki (JP); Hiroshi Iizuka, Kawasaki (JP); Hiroyuki Itou, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 10/639,467

(22) Filed: Aug. 13, 2003

(65) Prior Publication Data

US 2004/0057732 A1 Mar. 25, 2004

(30) Foreign Application Priority Data

Sep. 10, 2002 (JP) ............................. 2002-264261

(51) Int. Cl.
*H04B 10/17* (2006.01)
*H04B 10/12* (2006.01)

(52) U.S. Cl. ............................ 359/337.12; 359/341.41; 359/341.44

(58) Field of Classification Search .............. 359/337.1, 359/341.41, 337.5, 337.12, 341.44
See application file for complete search history.

(56) References Cited

U.S. PATENT DOCUMENTS 5,764,404 A 6/1998 Yamane et al. ................ 398/34
5,818,629 A * 10/1998 Kinoshita ............... 359/337.11
5,870,217 A 2/1999 Itou et al. ................... 359/179
6,008,935 A * 12/1999 Fujita et al. ............... 359/341.4
6,038,062 A * 3/2000 Kosaka ...................... 359/337
6,873,795 B1 3/2005 Sugaya ......................... 398/34

FOREIGN PATENT DOCUMENTS

| EP | 0734129 A2 | 9/1996 |
| EP | 1011213 A2 | 6/2000 |
| GB | 2294170 A | 7/1995 |
| GB | 2351387 A | 6/2000 |
| JP | 9-5212 | 1/1997 |
| JP | 2000-183854 | 6/2000 |
| JP | 2000-196169 | 7/2000 |
| JP | 2000-312046 | 11/2000 |

* cited by examiner

*Primary Examiner*—Eric Bolda
(74) *Attorney, Agent, or Firm*—Staas & Halsey LLP

(57) ABSTRACT

A photo amplifying apparatus for amplifying wavelength division multiplexed signals includes a specific wavelength measuring unit for measuring a specific wavelength at a measuring point, a total power measuring unit for measuring all wavelengths at the measuring point, and an output control unit for controlling the output of the photo amplifying apparatus based on the light power measured by the specific wavelength measuring unit and the total power measuring unit. Since the photo amplifying apparatus measures both the specific wavelength and all wavelengths, the photo amplifying apparatus can determine change in the number of multiplexed wavelengths and the gain gradient of the photo signals, and can properly control its output level.

16 Claims, 14 Drawing Sheets

OPTICAL AMPLIFYING APPARATUS FOR WAVELENGTH DIVISION MULTIPLEXED SIGNALS

BACKGROUND OF THE INVENTION

1. Field of the Invention

The present invention generally relates to a photo (light) amplifying apparatus, and more particularly, to a photo amplifying apparatus for amplifying wavelength division multiplexing (WDM) signals that includes a measuring unit that measures the power of a specific wavelength, a measuring unit that measures the total power of all wavelengths, and a controlling unit that controls the output power of the photo amplifying apparatus.

2. Description of the Related Art

Wavelength division multiplexing (WDM) is a pervading broad band technology in which a plurality of photo signals of different wavelengths is transmitted via a single optical transmission path.

The wavelength division multiplexing technology is applied to multi-channel optical communications of various distances. In practice, wavelength division multiplexing communication systems are required to flexibly support optical communications of various wavelengths and distances.

In general, a WDM photo amplifying apparatus of the WDM communication system amplifies photo signals so that the output power of output photo signals of each wavelength becomes equal. To achieve this object, the WDM photo amplifying apparatus controls excitation light sources and optical attenuators provided therein based on information about the power of photo signals monitored at various stages in the optical path and information for setting gain, the number of wavelengths, and output power, for example, received from an exterior resource.

FIG. 1 is a schematic diagram showing a conventional photo amplifying apparatus. The photo amplifying apparatus shown in FIG. 1 includes photo amplifying units 1, 2, a variable optical attenuator 6, a control unit 7, optical splitters 12-15, and photo diodes (optical monitors) 32-35.

The photo amplifying units 1, 2 further include Erbium-doped Fiber Amplifiers (EDFA) 3, 4, laser diodes (excitation light sources) 21, 22, and wavelength mixers 41, 42, respectively. The photo amplifying unit 1 further includes a gain equalizer 5.

The EDFAs 3, 4 are excited by the laser diodes 21, 22, respectively.

FIG. 2 is a graph showing the distribution of power (dBm) over wavelength (nm) of wavelength division multiplexing signals. As shown in FIG. 2, $X_{in}$, denotes the power of photo signals of each wavelength λ1-λn. The WDM signal having the power distribution shown in FIG. 2 is input to the photo amplifying apparatus via a input terminal IN. A fraction of the input photo signals is split from the main signal by the photo splitter (photo coupler) 12, and converted into an electric signal by the photo diode 32.

FIG. 3 is a schematic diagram showing the power of the photo signals monitored by the photo diode 32. The output of the photo diode 32 depends only on the total power ($=X_{in}+10\times\log(n)$) of photo signals over all wavelengths λ1-λn. Likewise, the outputs of the photo diodes 33-35 depend only on the total power of photo signals over all wavelengths λ1-λn incoming to the photo splitters 13-15, respectively.

The control unit 7 controls the power of each stage based on the total power of the photo signals over all wavelengths λ1-λn monitored by the photo diodes 32-35. As a result, the photo amplifying apparatus shown in FIG. 1 outputs the objective output photo signals via an output terminal OUT.

FIG. 4 is a schematic diagram for explaining the automatic level control (ALC) performed by the control unit 7. The control unit 7 of the photo amplifying apparatus shown in FIG. 1 automatically controls the optical level of each stage as follows:

(1) Controlling the laser diode (excitation light source) 21 so that the difference between the output $P_{PD33}$ of the photo diode 33 and the output $P_{PD32}$ of the photo diode 32 becomes constant.

$$P_{PD33} - P_{PD32} = A \text{(constant)} \quad (1)$$

(2) Controlling the laser diode (excitation light source) 22 so that the difference between the output $P_{PD35}$ of the photo diode 35 and the output $P_{PD34}$ of the photo diode 34 becomes constant.

$$P_{PD35} - P_{PD34} = B \text{(constant)} \quad (2)$$

In the case that the photo amplifying unit 1 (or 2) cannot achieve a predetermined gain A (or B), the control unit 7 raises the gain of the photo amplifying unit 2 (or 1) so as to make A+B constant.

(3) Controlling the variable attenuator 6 so that the output power from the output terminal OUT reaches the objective output level.

As a result of the above automatic gain control, an output of which level is determined based on the number of wavelengths is obtained via the output terminal OUT.

FIGS. 5A and 5B are schematic diagrams for explaining a problem that occurs in the case wherein the control unit 7 fails to control the output from the output terminal OUT at the level determined based on the number of wavelengths.

FIG. 5A illustrates the case wherein two wavelengths are used. The output powers of both wavelengths λ1, λ2 are assumed to be equal to the same value $X_{in}$. Under such a condition, the case in which the light source of the wavelength λ2 accidentally malfunctions is examined below.

Since the number of wavelengths to be amplified by the photo amplifying apparatus is reduced from two wavelengths to one wavelength, the output level of the photo amplifying apparatus is expected to be halved. However, if the control unit 7 is not informed that the number of input wavelengths is reduced to one, the control unit 7 compensates for the reduction in power level caused by the disappearance of wavelength λ2 by increasing the output level of λ1. Consequently, the control unit 7 cannot keep the output level per wavelength constant.

To solve this problem, in a large-capacity long-distance WDM communication system, an upper-rank photo transmitting apparatus informs the photo amplifying apparatus of a lower-rank photo transmitting apparatus of information such as the number of wavelengths and the output level of each wavelength to configure the photo amplifying apparatus of the lower rank photo transmitting apparatus.

The control unit 7 of the photo amplifying apparatus of the lower-rank photo transmitting apparatus controls the output based on the information (configuration information) received from the upper-rank photo transmitting apparatus so that the output power of the photo amplifying apparatus is kept at the level corresponding to the number of wavelengths.

Since the properties of optical parts built in conventional photo amplifying apparatuses are dispersed, the conventional photo amplifying apparatuses are adjusted one by one in an adjustment process of production so that the gradient of gain over wavelength becomes flat and the gains satisfy the following equations:

$$P_{PD33} - P_{PD32} = A \text{(dB)(constant), and} \quad (1)$$

$$P_{PD35} - P_{PD34} = B \text{(dB)(constant)} \quad (2)$$

Japanese Patent Laid-open Application No. 2000-312046 discloses a technique with which difference between gains of a photo amplifying apparatus determined by various input wavelengths caused by change in optical fiber loss can be eliminated. According to this application, a controlling unit built into the photo amplifying apparatus controls the operation of the photo amplifying apparatus based on the intensity of received reference light.

Japanese Patent Laid-open Application No. 2000-196169 discloses a technique for a photo amplifying apparatus of a WDM communication system that multiplexes and transmits a plurality of photo signals with which the degradation of nonlinear property and signal-to-noise ratio due to change in the number of channels is eliminated. According to this application, a photo amplifying apparatus is provided with the following: a first portion including an optical fiber with rare earth element doped, an excitation laser diode, and an automatic optical gain control circuit; a second portion including an optical attenuator and an automatic level control circuit; and a monitor signal processing circuit. Before a change in the number of channels, the photo amplifying apparatus outputs amplifying a WDM signal of which level is determined by the number of channels. When the photo amplifying apparatus is informed of the change in the number of channels, the photo amplifying apparatus temporarily fixes the transmissivity of the optical attenuator, and keeps its gain constant so as to output a photo signal of which level corresponds to the number of channels. After the change in the number of channels, the photo amplifying apparatus resumes controlling the transmissivity of the optical attenuator and its gain.

In the case in which a signal of a certain wavelength unexpectedly vanishes due to the malfunction of a light source, for example, the upper-rank photo transmission apparatus determines that the number of wavelengths has changed. After the determination, the upper-rank photo transmission apparatus informs the photo amplifying apparatus of a lower-rank photo transmission apparatus receiving configuration information (the number of wavelengths and the output levels, for example) from the upper-rank photo transmission apparatus, about the change in the number of wavelengths. Accordingly, the photo amplifying apparatus receives the information indicating that the number of wavelengths has changed in a delay (from hundreds of msec to several sec) after the number of wavelengths actually changes.

A conventional photo amplifying apparatus absorbs the delay to the extent from hundreds of msec to several sec in the following manner.

An optical attenuator with a dead time from hundreds of msec to several sec may be used; the optical attenuator operates with the delay from hundreds of msec to several sec. Even if the photo amplifying apparatus receives the information indicating that the number of wavelengths has changed, during the delay (from hundreds of msec to several sec) after the number of wavelengths actually changes, the optical attenuator does not react. Accordingly, the photo amplifying apparatus is not affected by the delay time.

Alternatively, monitoring circuits sampling signal levels at each stage may be required to retain their sampled values for a retention time of about several seconds. Since an optical attenuator is controlled based on the sampled signal levels monitored by the monitoring circuits, the optical attenuator is controlled after the retention time of several seconds. Accordingly, the photo amplifying apparatus can avoid being affected by the delay in receiving the information.

However, the time required for the information of the number of wavelengths to be transmitted from the upper-rank photo transmission apparatus to the photo amplifying apparatus depends on the performance of the upper-rank photo transmission apparatus for determining the number of wavelengths, and consequently, differs one after another. There remains a problem in that the above dead time and/or holding time needs to be optimized for each upper rank photo transmission apparatus.

Because the total gain of a photo amplifying apparatus is desired to be indifferent for various wavelengths, the gain of the photo amplifying unit of the photo amplifying apparatus needs to be adjusted to compensate for the difference in optical efficiency of the remaining portion of the photo amplifying apparatus other than the photo amplifying unit.

Conventionally, the gain of the photo amplifying unit of each WDM photo amplifying apparatus is individually adjusted in the production process based on a test condition (for example the maximum number of wavelengths). Accordingly, if the WDM photo amplifying apparatus is used in practice under a different condition (for example the number of wavelengths) from the test condition defining the maximum number of wavelengths, for example, the desired flatness of the total gain of the WDM photo amplifying apparatus may not be achievable.

For example, as shown in FIG. 6, even though the photo amplifying apparatus is adjusted in its production process based on the maximum number of wavelengths (ten, for example), the photo amplifying apparatus is often used with the number of wavelengths (seven, for example) being less than the maximum number. In this case, the gain of the photo amplifying apparatus may exhibit a gradient as shown in FIG. 7.

The invention taught in Japanese Patent Laid-open Application No. 2000-312046 still inherits a problem that the wavelength of the reference light needs to be different from the wavelength of the main signals. Another problem of the invention is that the number of wavelengths cannot be identified.

According to the invention taught in Japanese Patent Laid-open Application No. 2000-196169, when the wavelength number is changed, the transmissivity, for example, of the optical attenuator is temporarily fixed, and then, after the wavelength number is changed, the control of the optical attenuator is resumed. This invention also inherits the above problems.

SUMMARY OF THE INVENTION

Accordingly, it is a general object of the present invention to provide a novel and useful photo amplifying apparatus in which one or more of the problems described above are eliminated.

Another and more specific object of the present invention is to provide a photo amplifying apparatus that detects the change in wavelength number and the gain gradient of photo signals based on the photo signals, and controls the output level.

To achieve one or more of the above objects, a photo amplifying apparatus for amplifying wavelength division multiplexing signals, according to an aspect of the present invention, includes:

a specific wavelength measuring unit that measures the light power of photo signals of a specific wavelength at a measuring point;

a total power measuring unit that measures the light power of the photo signals of all wavelengths at the measuring point; and an output control unit that controls the output of the photo amplifying apparatus based on the light power measured by the partial wavelength measuring unit and the light power measured by the total power measuring unit.

The photo amplifying apparatus measures both the light power of a specific wavelength and the light power of all wavelengths at the measuring point. Accordingly, the photo amplifying apparatus can determine a change in the number of multiplexed wavelengths and in the gain gradient of the photo signal based on the measured light power, and can properly control its output level.

According to another aspect of the present invention, the photo amplifying apparatus is further characterized in that the specific wavelength measuring unit further includes a variable-wavelength optical filter.

Even if a specific wavelength (signal) stops due to a malfunction, for example, the photo amplifying apparatus provided with the variable-wavelength optical filter can switch to an alternative wavelength and continue monitoring the light power of the alternative wavelength. Accordingly, the output control unit can continuously control the photo amplifying apparatus.

Other objects, features, and advantages of the present invention will be more apparent from the following detailed description when read in conjunction with the accompanying drawings.

DETAILED DESCRIPTION OF THE PREFERRED EMBODIMENTS

Preferred embodiments of the present invention are described below with reference to the drawings.

First Embodiment

Figure 1:
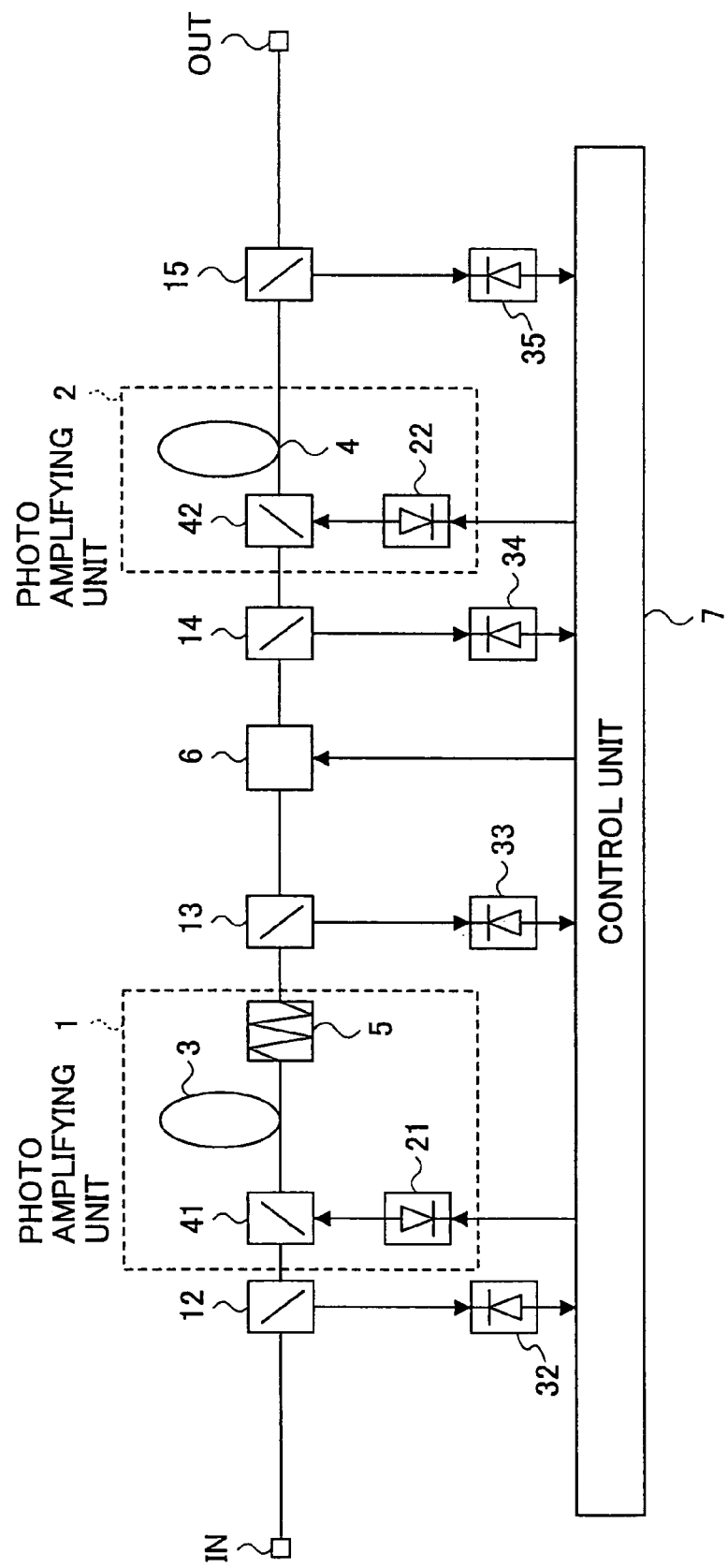
FIG. 1 is a schematic diagram showing a conventional photo amplifying apparatus.
Figure 2:
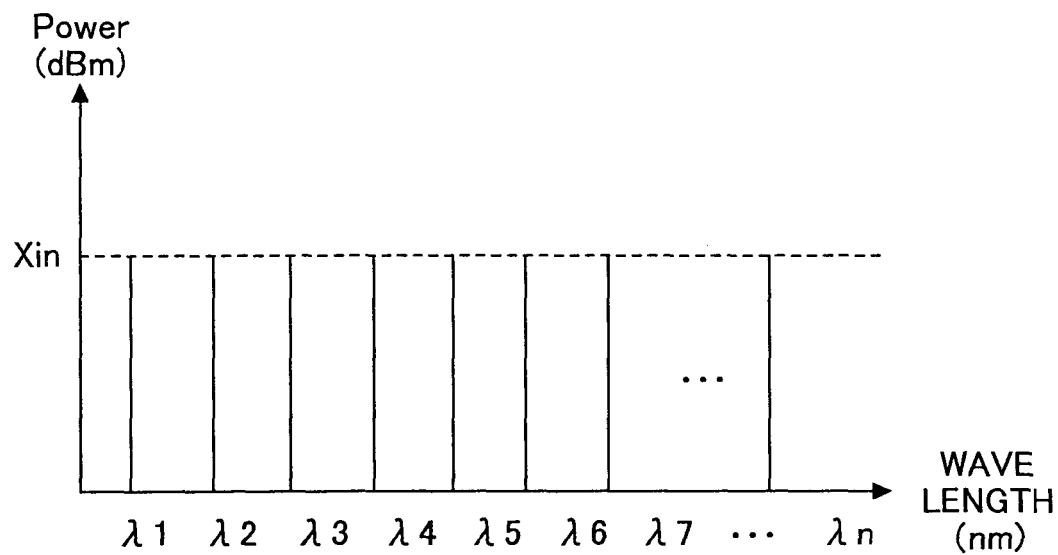
FIG. 2 is a graph for explaining photo signals input to a photo amplifying apparatus.
Figure 3:
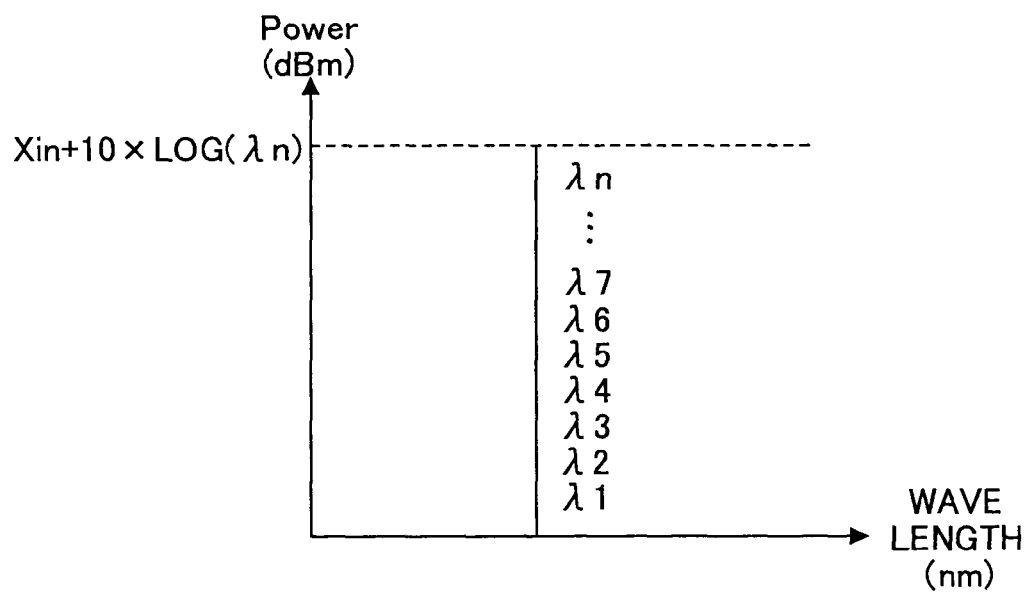
FIG. 3 is a graph for explaining the total power of photo signals monitored by a photo diode.
Figure 4:
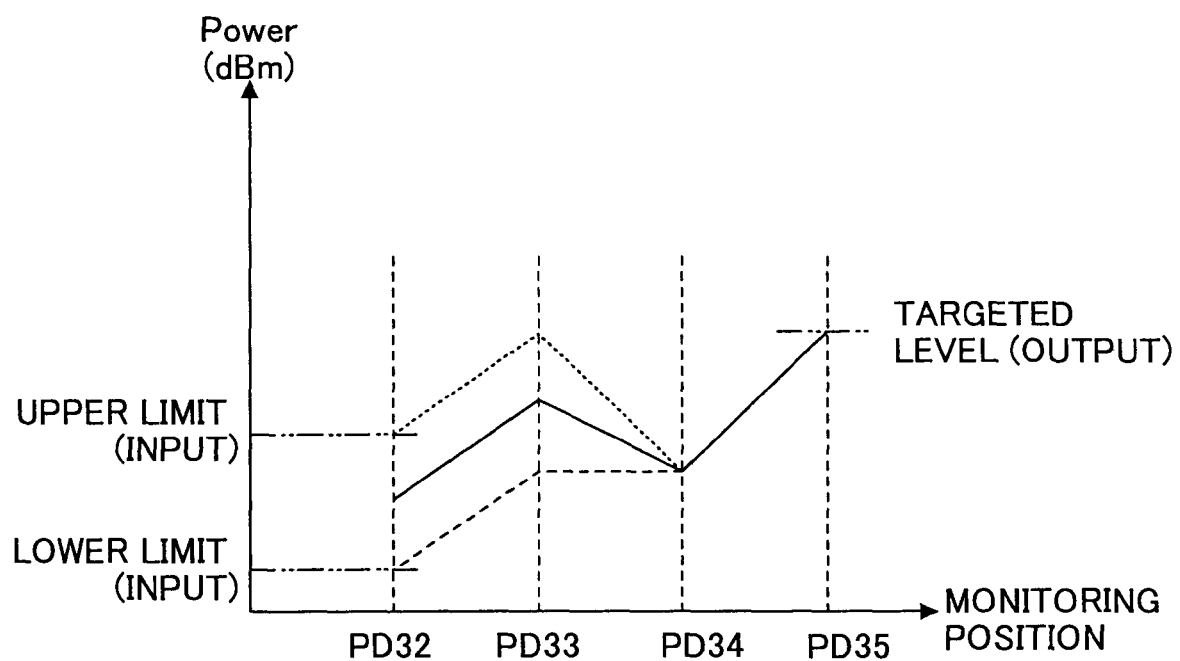
FIG. 4 is a graph for explaining the amplification and attenuation of photo signals by a photo amplifying apparatus.
Figure 5B:
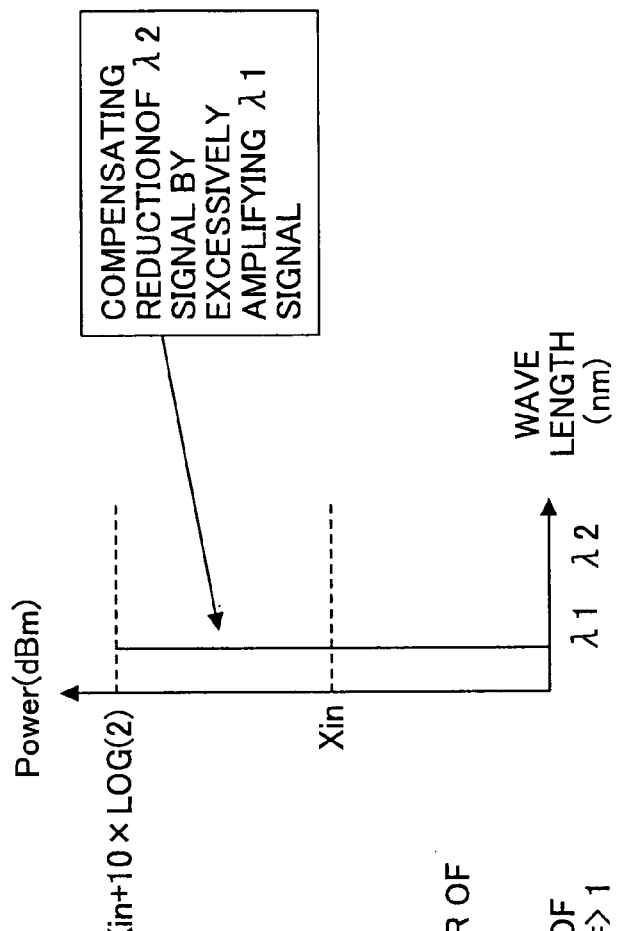
FIGS. 5A and 5B are graphs for explaining a problem caused by the reduction in number of wavelengths.
Figure 5A:
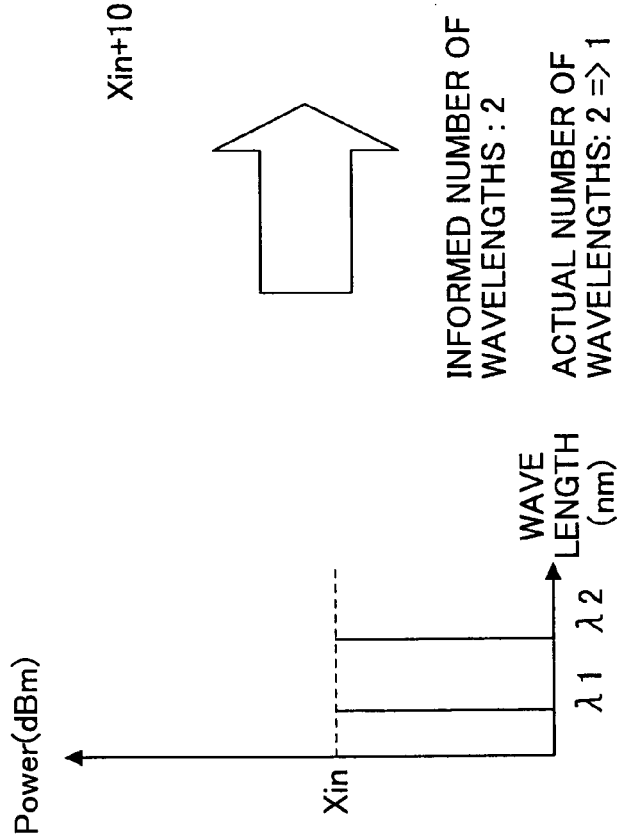
Figure 6:
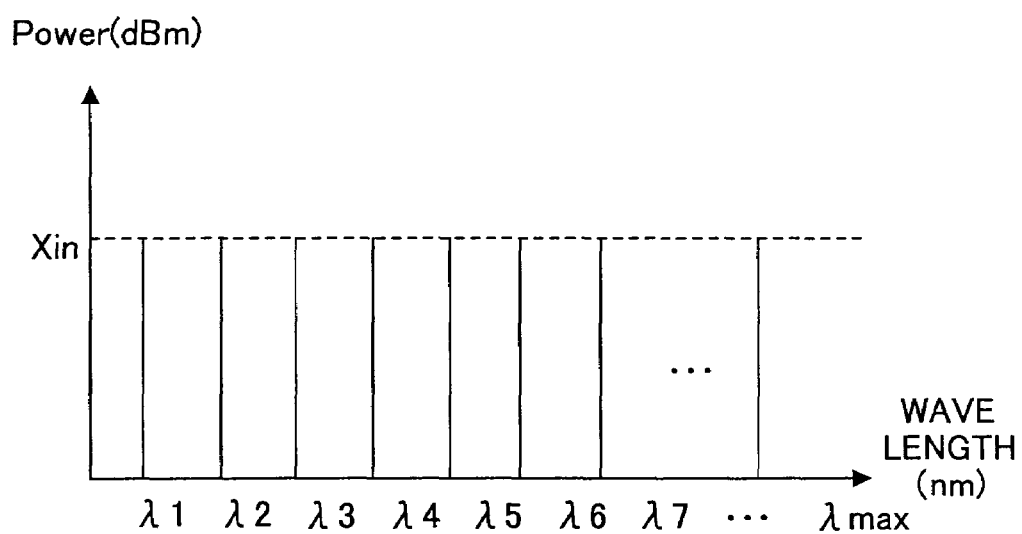
FIG. 6 is a graph for explaining the flatness of gain over the maximum number of wavelengths.
Figure 7:
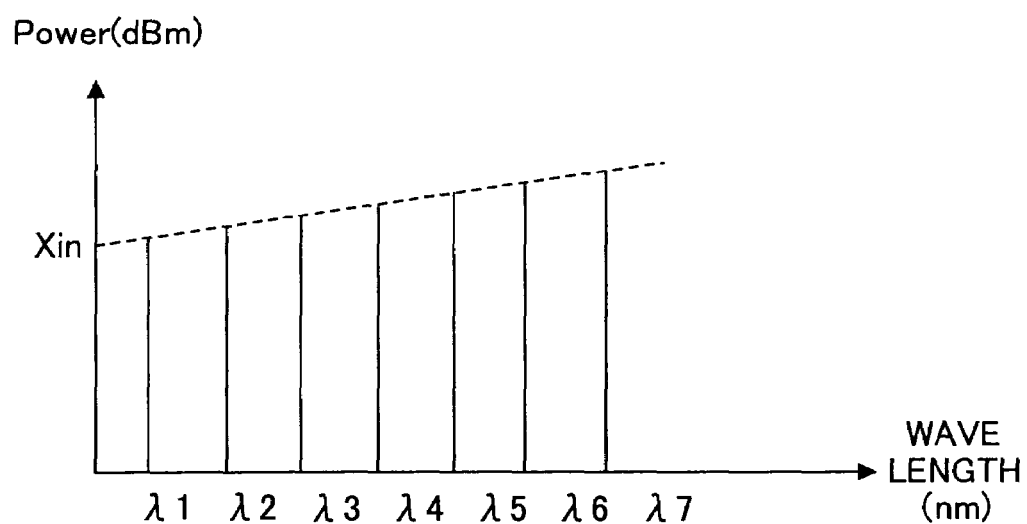
FIG. 7 is a graph for explaining the gradient of gain over seven wavelengths.
Figure 8:
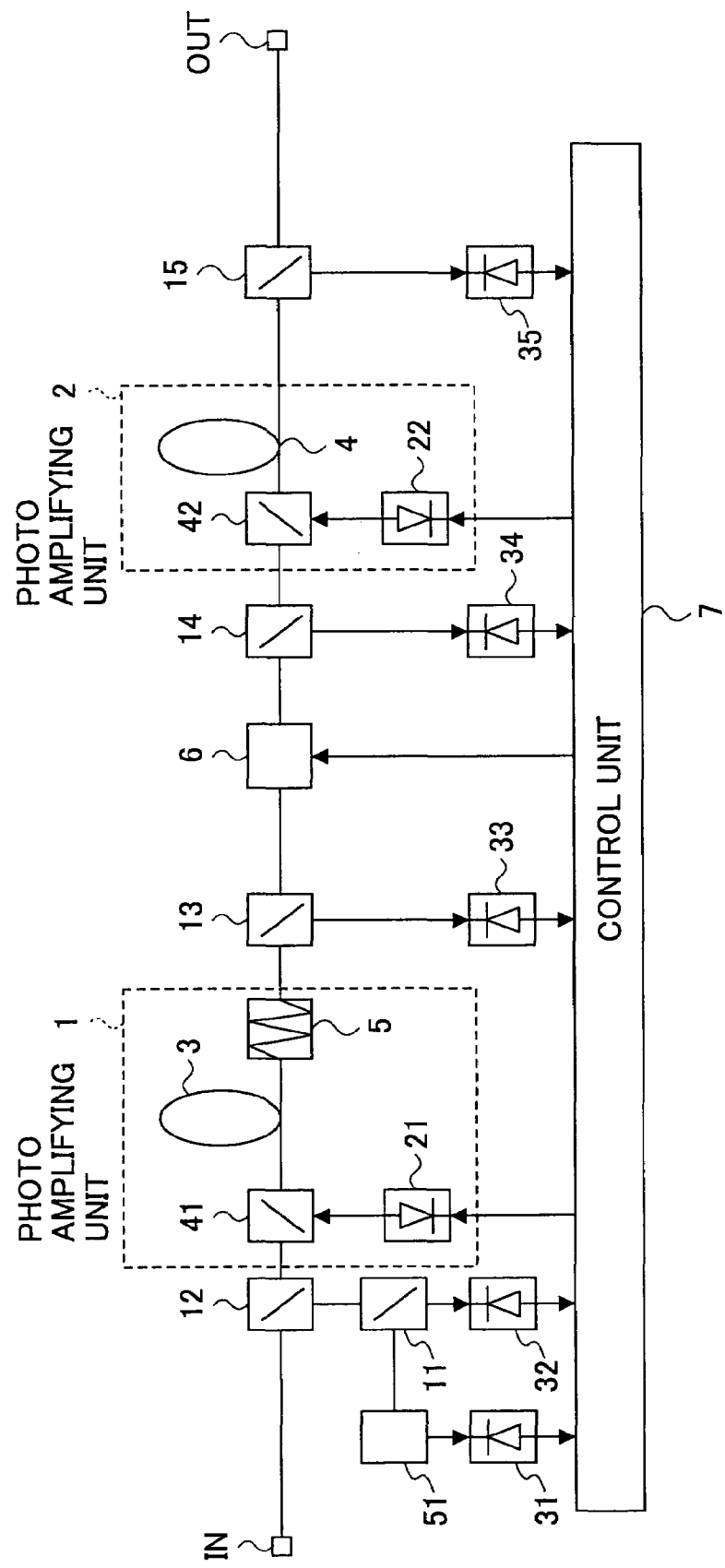
FIG. 8 is a schematic diagram showing a photo amplifying apparatus according to the first embodiment of the present invention.

FIG. 8 is a schematic diagram showing a photo amplifying apparatus according to the first embodiment of the present invention.

The photo amplifying apparatus shown in FIG. 8 includes the following: photo amplifying units 1, 2, a variable optical attenuator 6, a control unit 7, optical splitters 11-15, photo diodes 31-35, and a fixed optical filter 51.

The fixed optical filter 51 transmits photo signals of a specific wavelength. The photo amplifying unit 1 further includes a laser diode 21 (excitation light source), a wavelength mixer 41, EDFA 3, and gain equalizer 5. The photo amplifying unit 2 further includes a laser diode 22 (excitation light source), a wavelength mixer 42, and EDFA 4.

WDM photo signals (wavelengths: $\lambda1$-$\lambda n$, intensity $X_{in}$) are provided to a photo signal input terminal IN. The input photo signal is amplified by the photo amplifying unit 1. The amplified photo signal is attenuated down to a predetermined signal level by the variable optical attenuator 6. The attenuated photo signal is amplified up to a predetermined signal level by the photo amplifying unit 2. Then the amplified photo signal is output from the photo signal output terminal OUT.

The photo diode 31 detects the signal level ($P_{PD31}$) of the photo signal of the specific wavelength transmitting through the fixed optical filter 51. The photo diode 32 detects the total power $P_{PD32}$ of photo signals (wavelengths: $\lambda1$-$\lambda n$) before being amplified by the photo amplifying unit 1. Likewise, the photo diode 33 detects the total power $P_{PD33}$ of photo signals (wavelengths: $\lambda1$-$\lambda n$) after being amplified by the photo amplifying unit 1.

The photo diode 34 detects the total power $P_{PD34}$ of photo signals (wavelengths: $\lambda1$-$\lambda n$) before being amplified by the photo amplifying unit 2. The photo diode 35 detects the total power $P_{PD35}$ of photo signals (wavelengths: $\lambda1$-$\lambda n$) after being amplified by the photo amplifying unit 2.

(1) The control unit 7 of the photo amplifying apparatus controls the laser diode (excitation light source) 21 so that the difference between the output $P_{PD33}$ of the photo diode 33 and the output $P_{PD32}$ of the photo diode 32 becomes constant.

$$P_{PD33} - P_{PD32} = D(\text{dB})(\text{constant}) \quad (3)$$

(2) The control unit 7 of the photo amplifying apparatus controls the laser diode (excitation light source) 22 so that the difference between the output $P_{PD35}$ of the photo diode 35 and the output $P_{PD34}$ of the photo diode 34 becomes constant.

$$P_{PD35} - P_{PD34} = E(\text{dB})(\text{constant}) \quad (4)$$

(3) If the gain of either the photo amplifying unit 1 or the photo amplifying unit 2 cannot achieve the predetermined gains D or E, the control unit 7 of the photo amplifying apparatus raises the gain of the other photo amplifying unit 2 or the photo amplifying unit 1 so that $$D+E=\text{constant} \quad (5)$$

(4) The control unit 7 of the photo amplifying apparatus controls the variable optical attenuator 6 so that the output power $P_{PD35}$ from the output terminal OUT is tuned at a target output level.

Assuming the light intensity input to the photo signal input terminal IN is "a" (dBm/ch), and the light intensity output from the photo signal output terminal OUT is "b" (dBm/ch), the light intensities $P_{PD31}$, $P_{PD32}$, and $P_{PD35}$ monitored by the photo diodes 31, 32, and 35, respectively, are:

$$P_{PD31} = a(dBm/ch) \quad (6)$$

$$P_{PD32} = a + 10 \times \log(n)(dBm)[\text{total power}] \quad (7)$$

$$P_{PD35} = b + 10 \times \log(n)(dBm)[\text{total power}] \quad (8)$$

If the loss of the transmission path connected to the photo signal input terminal IN changes +/−x (dB), the light intensities $P_{PD31}$ and $P_{PD32}$ monitored by the photo diodes 31 and 32, respectively, becomes:

$$P_{PD31} = a \pm x(dBm/ch) \quad (9)$$

$$P_{PD32} = a + 10 \times \log(n) \pm x(dBm) \quad (10)$$

Assuming the change in the monitored photo intensities $P_{PD31}$ and $P_{PD32}$ being $\Delta x1$ and $\Delta x2$, respectively, the equations (6), (7), (9), and (10) lead to the following relations:

$$\Delta x1 = \pm x \quad (11)$$

$$\Delta x2 = \pm x \quad (12)$$

Accordingly, $\Delta x1$ and $\Delta x2$ are equal.

On the other hand, if the wavelength number changes from "n" to "n±m", the light intensities $P_{PD31}$ and $P_{PD32}$ monitored by the photo diode 31 and the photo diode 32, respectively, are obtained as follows:

$$P_{PD31} = a(dBm/ch) \quad (13)$$

$$P_{PD32} = a + 10 \times \log(n \pm m)[\text{total power}] \quad (14)$$

As is understandable from the above equations, whereas the light intensity $P_{PD31}$ monitored by the photo diode 31 does not change ($\Delta x1=0$), the change $\Delta x2$ in the light intensity $P_{PD32}$ is:

$$\Delta x2 = 10 \times \log[(n \pm m)/n] \quad (15)$$

Accordingly, when detecting change in the input signal level, one can determine whether the change is caused by either the loss of the transmission path or the change in wavelength number by comparing the change $\Delta x1$ and $\Delta x2$ in the monitored light intensities $P_{PD31}$ and $P_{PD32}$.

If the light intensity $P_{PD31}$ monitored by the photo diode 31 and the light intensity $P_{PD32}$ monitored by the photo diode 32 change in the same quantity, one can determine that the change in the input signal level is caused by the loss of the transmission path. If the monitored light intensity $P_{PD31}$ monitored by the photo diode 31 does not change, but the monitored light intensity $P_{PD32}$ monitored by the photo diode 32 does change, one can determine that the change in the input signal level is caused by the change in wavelength number.

Since "n" is known, the change in wavelength number "m" is obtained based on the equation (15) as follows:

$$m = \pm n \times (10^{\Delta x2/10} - 1) \quad (16)$$

Accordingly, the photo amplifying apparatus can identify the current number of wavelengths as soon as the input signal changes without waiting for configuration information about the number of wavelengths to be transmitted from the upper rank monitoring apparatus of the photo amplifying apparatus. Consequently, it is not necessary to set a dead time or a time lag of the photo amplifying apparatus, or optimize the dead time or the time lag depending on the upper rank photo transmission apparatus.

Additionally, since the photo amplifying apparatus can identify the number of wavelengths, the photo amplifying apparatus can control the optical attenuator 6 so that the output photo signal achieves a target:

$$b + 10 \times \log(n) + 10 \times \log[(n \pm m)/n](dBm) \quad (17)$$

without waiting for the configuration information transmitted from the upper rank observing apparatus of the photo amplifying apparatus.

Figure 9:
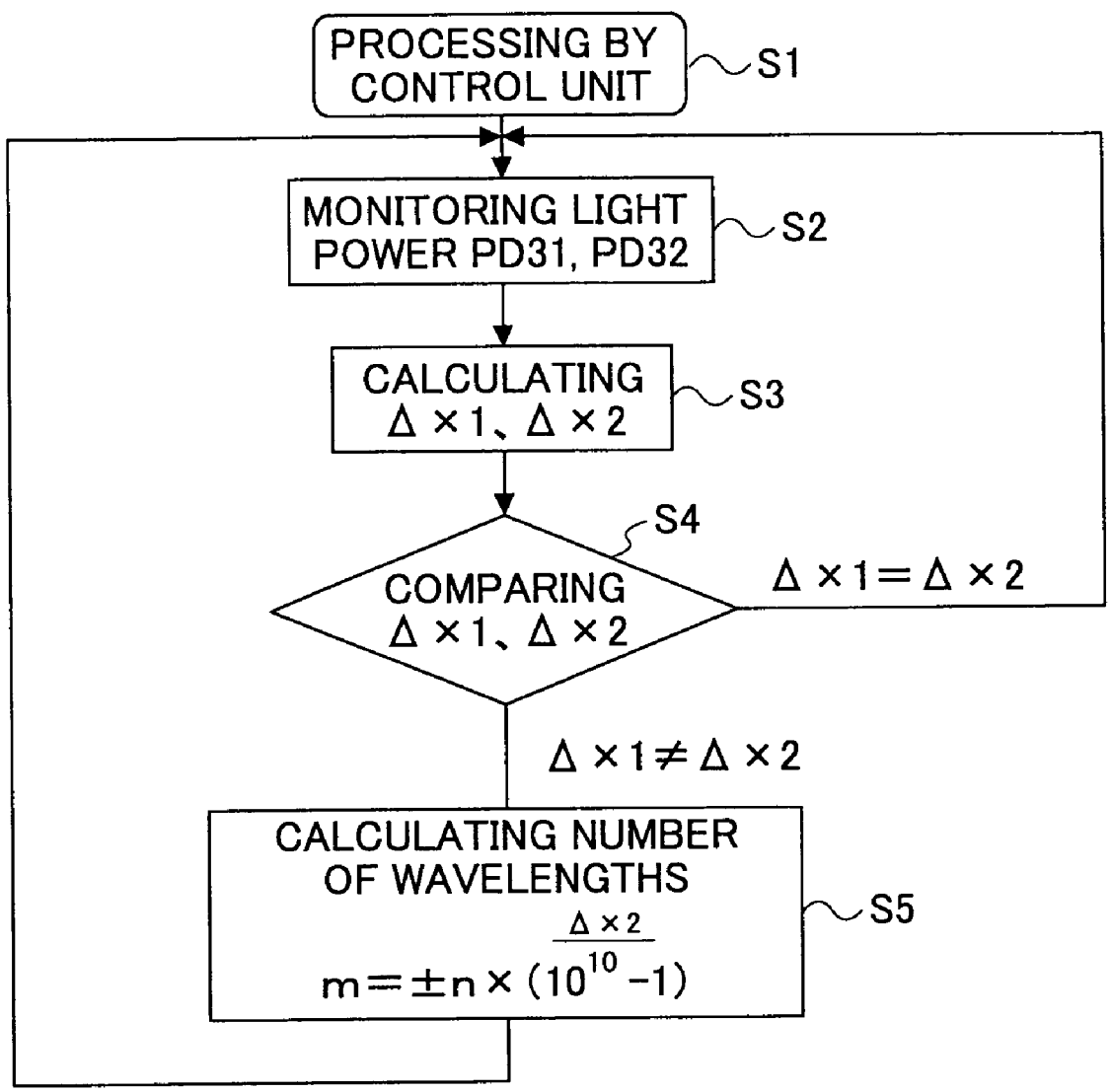
FIG. 9 is a flow chart for obtaining the number of wavelengths.

FIG. 9 is a flow chart showing the calculation of the number of wavelengths "m" by the control unit 7 of the photo amplifying apparatus shown in FIG. 8.

The light intensity is monitored by the photo diodes 31 and 32 (step S2). Then, the changes $\Delta x1$ and $\Delta x2$ in the light intensities monitored by the photo diodes 31 and 32, respectively, are calculated (step S3).

$\Delta x1$ and $\Delta x2$ are compared (step S4). If $\Delta x1=\Delta x2$, which means that the change in the input signal level is caused by a loss of the transmission path, the process returns to step S2. If $\Delta x1 \neq \Delta x2$, the increased or decreased number of wavelengths is obtained based on the equation (16) (step S5).

As described above, since the photo amplifying apparatus shown in FIG. 8 can alone identify the number of wavelengths, the photo amplifying apparatus does not need to be provided with dead time or retention time of hundreds msec for controlling the photo output signal to be constant. The photo amplifying apparatus consequently can control the photo output signal at high speed.

The photo amplifying apparatus detects the change in the number of wavelengths as soon as the change occurs, and controls the photo output signal based on the detected change in the number of wavelengths. Accordingly, the control by the photo amplifying apparatus becomes stable.

Second Embodiment

The second embodiment of the present invention is described with reference to FIG. 10. A photo amplifying apparatus of FIG. 10 includes the following: photo amplifying units 1, 2, a variable optical attenuator 6, a control unit 7, optical splitters 12-16, photo diodes 32-36, and a fixed optical filter 52. The photo amplifying unit 1 further includes a laser diode (excitation light source) 21, a wavelength mixer 41, an EDFA 3, and a gain equalizer 5. The photo amplifying unit 2 further includes a laser diode (excitation light source) 22, a wavelength mixer 42, and an EDFA 4.

Elements that are identical to those of the photo amplifying apparatus shown in FIG. 8 are referred to by the same numerals, and their description is omitted. The photo amplifying apparatus shown in FIG. 10 is basically the same as the photo amplifying apparatus shown in FIG. 8 except for the optical splitter 11, the fixed optical filter 51, and the photo diode 31 that are removed, and the optical splitter 16, the fixed optical filter 52, and the photo diode 36 that are added. The fixed optical filter 52 transmits a photo signal of specific wavelength.

WDM photo signals (wavelengths: λ1-λn, intensity $X_{in}$) are provided to a photo signal input terminal IN. The input photo signal is amplified by the photo amplifying unit 1. The amplified photo signal is attenuated down to a predetermined signal level by the variable optical attenuator 6. The attenuated photo signal is amplified up to a predetermined signal level by the photo amplifying unit 2. Then the amplified photo signal is output from the photo signal output terminal OUT.

The photo diode 32 detects the total power $P_{PD32}$ of photo signals (wavelengths: λ1-λn) before being amplified by the photo amplifying unit 1. Likewise, the photo diode 33 detects the total power $P_{PD33}$ of photo signals (wavelengths: λ1-λn) after being amplified by the photo amplifying unit 1. The photo diode 34 detects the total power $P_{PD34}$ of photo signals (wavelengths: λ1-λn). The photo diode 35 detects the total power $P_{PD35}$ of the photo signals (wavelengths: λ1-λn) after being amplified by the photo amplifying unit 2. The photo diode 36 detects the signal level ($P_{PD36}$) of the photo signal of the specific wavelength transmitting through the fixed optical filter 52.

(1) The control unit 7 of the photo amplifying apparatus controls the laser diode (excitation light source) 21 so that the difference between the output $P_{PD33}$ of the photo diode 33 and the output $P_{PD32}$ of the photo diode 32 becomes constant.

$$P_{PD33}-P_{PD32}=D(\text{dB})(\text{constant}) \quad (3)$$

(2) The control unit 7 of the photo amplifying apparatus controls the laser diode (excitation light source) 22 so that the difference between the output $P_{PD35}$ of the photo diode 35 and the output $P_{PD34}$ of the photo diode 34 becomes constant.

$$P_{PD35}-P_{PD34}=E(\text{dB})(\text{constant}) \quad (4)$$

(3) If either the photo amplifying unit 1 or the photo amplifying unit 2 cannot achieve the respective predetermined gains D or E, the control unit 7 of the photo amplifying apparatus raises the gain of the other photo amplifying unit 2 or the photo amplifying unit 1 so that $$D+E=\text{constant} \quad (5)$$

(4) The control unit 7 of the photo amplifying apparatus controls the variable optical attenuator 6 so that the output power $P_{PD35}$ from the output terminal OUT is tuned to a target output level.

The control unit 7 controls the laser diodes 21 and 22 that are excitation light sources of the EDFA 3 and 4, respectively, and consequently, controls the gains of the photo amplifying units 1 and 2 so as to make their gains flat enough.

The following equation needs to be satisfied:

$$[(P_{PD35}-ASE)/n]/P_{PD36}=\text{constant} \quad (18)$$

where "n" is the number of wavelengths amplified by the photo amplifying apparatus, and ASE is noise power caused by accumulated spontaneous emission, for example.

($P_{PD35}$-ASE) is the power of signal component, and ($P_{PD35}$-ASE)/n is the power of signal component per a wavelength. The equation (18) means that the ratio between the power of signal component per a wavelength and $P_{PD36}$ is constant. $P_{PD36}$ is the power of an arbitrarily selected wavelength. The constant ratio between the power of the arbitrarily selected wavelength and the average power over "n" wavelengths means that the gain of the photo amplifying apparatus is flat. ASE is determined based on a different experiment.

If the equation (18) is not satisfied, the gain is not flat. Accordingly, the control unit 7 controls the laser diodes 21 and 22 that are excitation light sources so that the ratio between ($P_{PD35}$-ASE)/n and the level $P_{PD36}$ of the photo signal transmitting through the fixed optical filter 52 achieves a predetermined value.

The control unit 7 controls the variable optical attenuator 6 so that the power of photo signal per wavelength ($P_{PD35}$-ASE)/n is kept at a predetermined value in order to compensate the power per wavelength.

Figure 11:
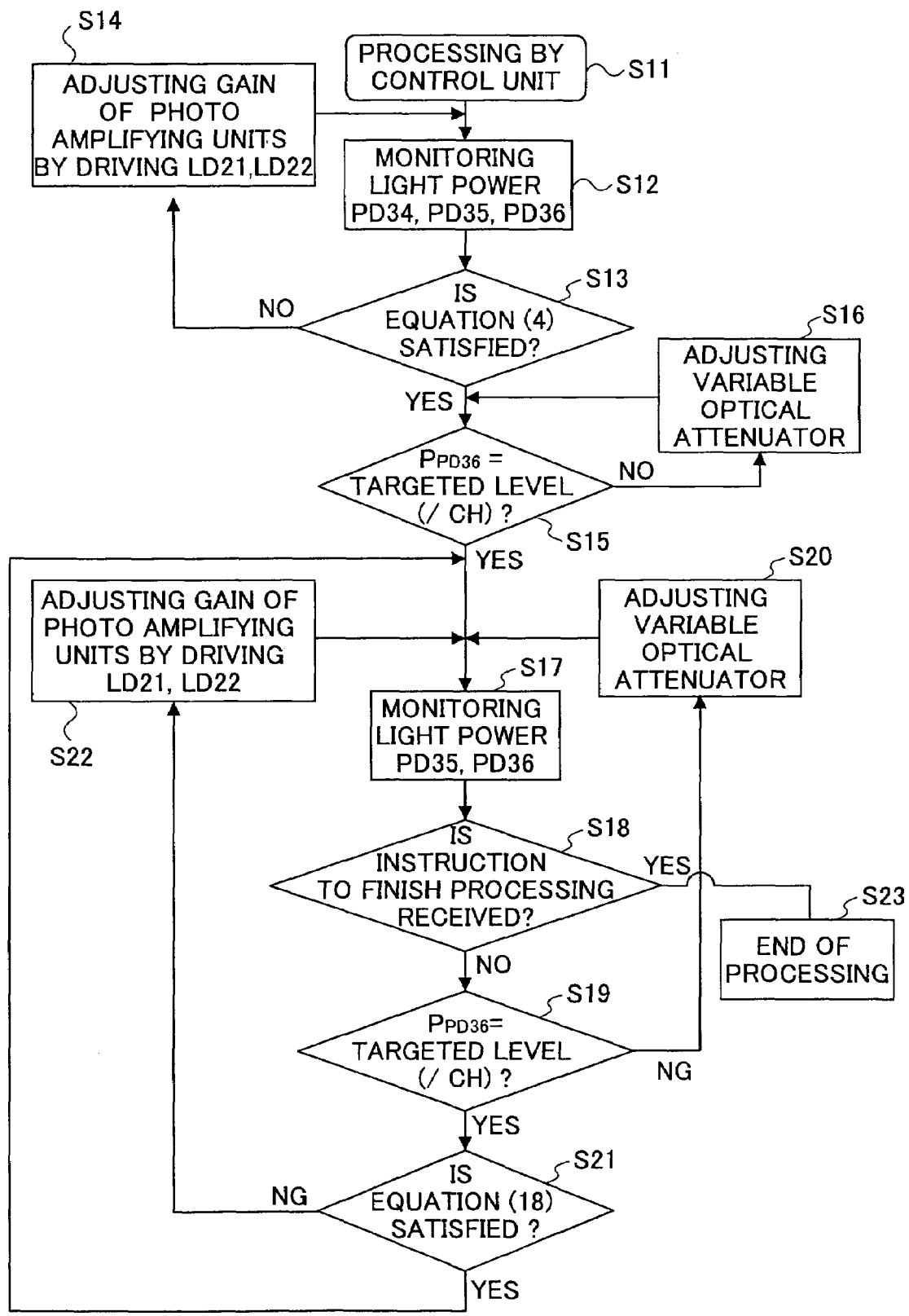
FIG. 11 is a flow chart for making gains flat (constant)

FIG. 11 is a flow chart for explaining processing by the control unit 7 of the photo amplifying apparatus for making gain thereof flat.

Figure 12:
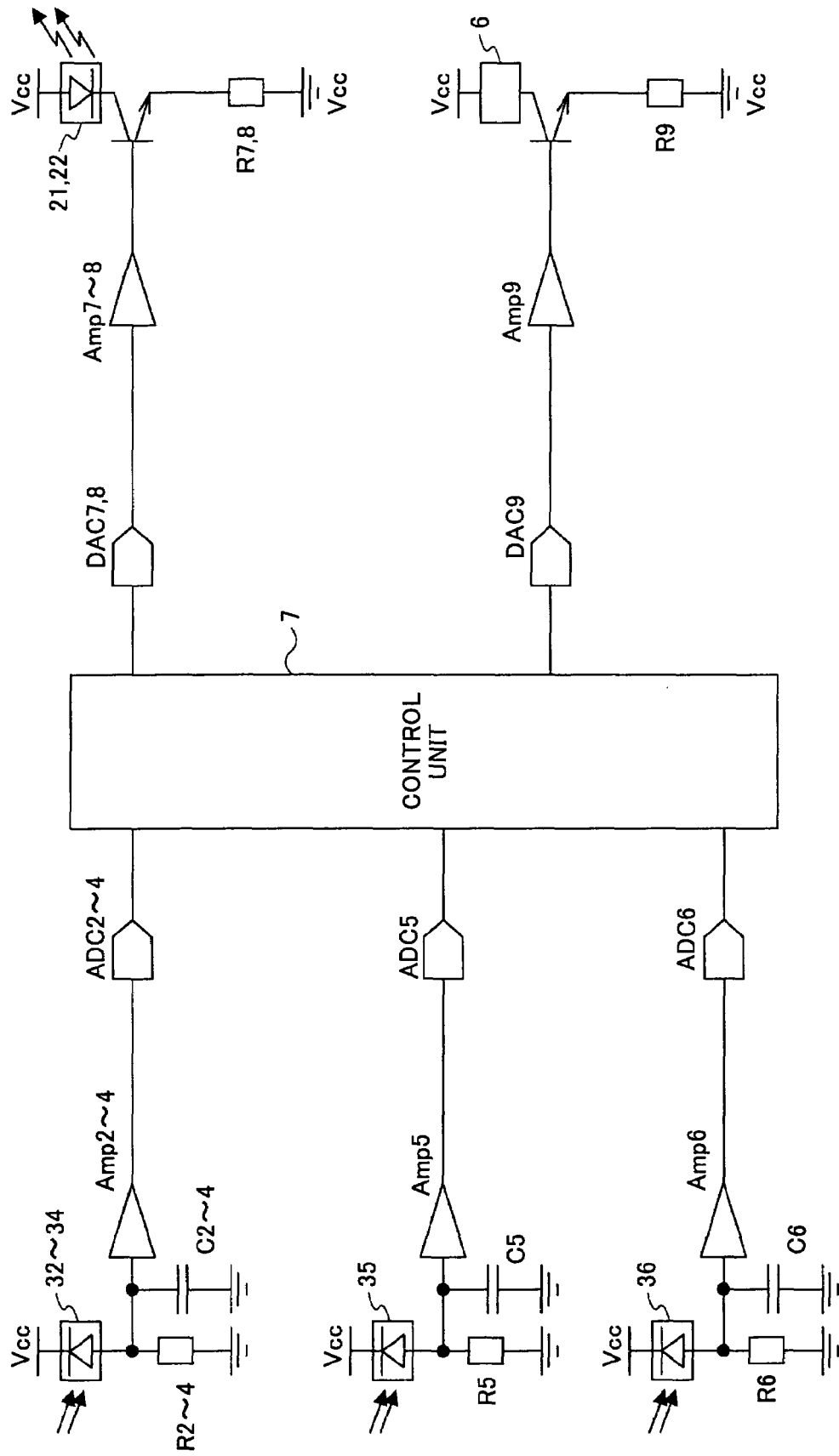
FIG. 12 is a circuit diagram for explaining processing for flattening gains.

FIG. 12 is a block diagram for explaining processing by the control unit 7 of the photo amplifying apparatus for making gain thereof flat.

The processing by the control unit 7 is described below with reference to FIGS. 11 and 12.

As shown in FIG. 12, the photo signals are received and converted into current signals by the photo diodes 32-34, 35, and 36, and are converted into voltage signals by resistors R2-R4, R5, and R6. The voltage signals are amplified by amps 2-4, 5, 6, and further converted into digital signals by analog-digital converters ADC2-4, 5, and 6. Then, the digital signals are input to the control unit 7.

The control unit 7 processes the input digital signals as follows (initial operation):

(1) Detecting the signal level of outputs from AMP4, 5, and 6 (step S12).

(2) Driving the laser diode 22 that is the excitation light source of the photo amplifying unit 2 so that the ratio between electric signals of Amp 4 and 5 becomes a predetermined value to control the gain (step S13, S14).

(3) Controlling the variable optical attenuator 6 so that the level of the electric signal of Amp 6 becomes a predetermined value (steps S15, S16).

After the above processing, the control unit 7 performs the following to compensate the gain gradient and the output per wavelength:

(4) Detecting the electric signal levels of Amp 5 and Amp 6 (step S17).

(5) Controlling the variable optical attenuator 6 so that the electric signal level of Amp 6 becomes a set value (steps S19, S20).

(6) Controlling the laser diodes 21 and 22 that are the excitation light sources of the photo amplifying units 1 and 2, respectively, so that the equation (18) is satisfied (steps S21, S22).

If the control unit 7 receives an instruction to stop processing or detects that the input signal stops, the control unit 7 exits the processing (steps S18, S23).

Third Embodiment

Figure 13:
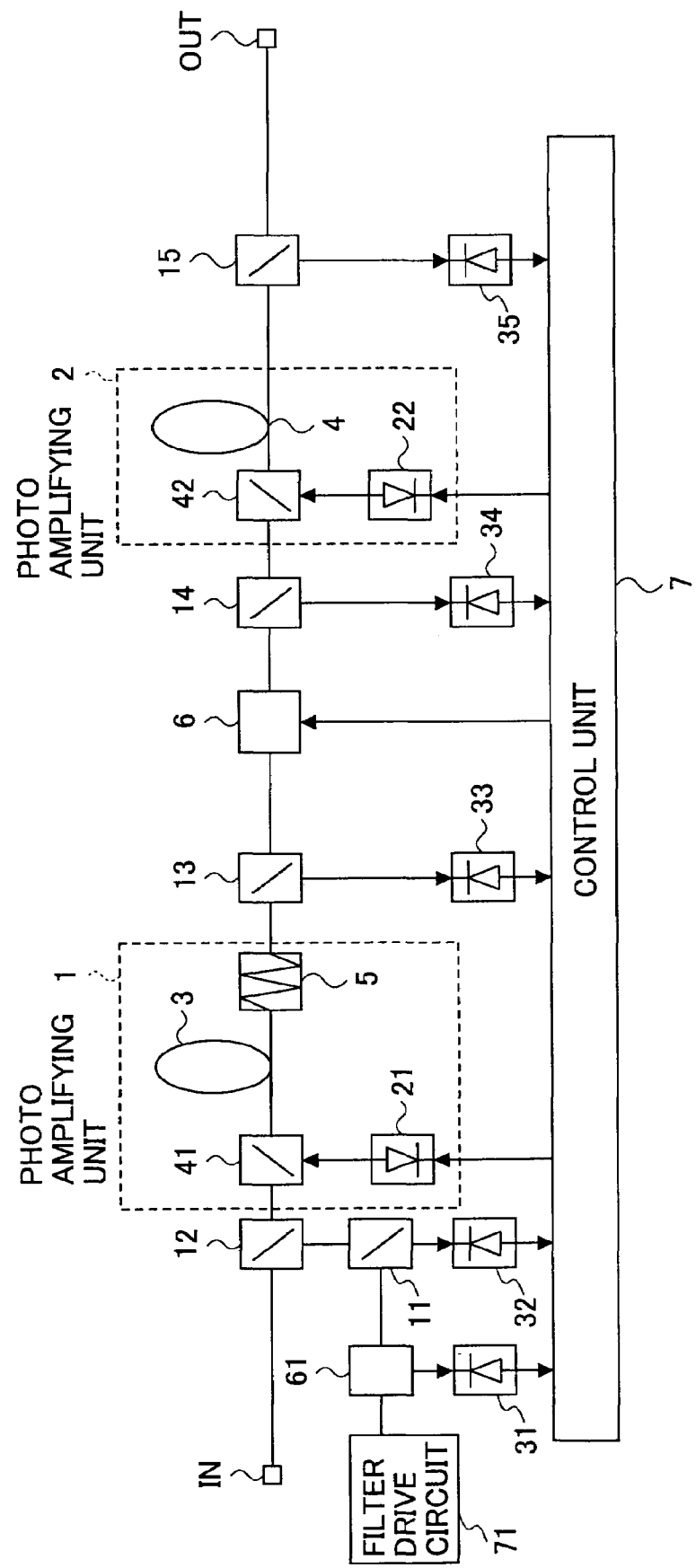
FIG. 13 is a schematic diagram showing a photo amplifying apparatus according to the third embodiment of the present invention.

FIG. 13 is a schematic diagram showing a photo amplifying apparatus according to the third embodiment of the present invention.

Elements that are identical to those of the photo amplifying apparatus shown in FIG. 8 are referred to by the same reference numerals, and their description is omitted.

The photo amplifying apparatus shown in FIG. 13 is the same as the photo amplifying apparatus shown in FIG. 8 except that the fixed optical filter 51 that transmits photo signals of a specific wavelength is replaced with a variable optical filter 61 that transmits photo signals of a specific wavelength, and a drive circuit 71 that controls the variable optical filter 61. Any wavelength can be selected with these new components.

The operation of the photo amplifying apparatus shown in FIG. 13 is basically identical to that of the photo amplifying apparatus shown in FIG. 8. The advantage of the photo amplifying apparatus according to the third embodiment is that, if the photo signal of the specific wavelength detected by the photo diode 31 stops due to a malfunction, for example, the control unit 7 causes the variable optical filter 61 to switch to another wavelength and continue monitoring the photo signal of the other wavelength. In the case of the photo amplifying apparatus according to the first embodiment, however, if the photo signal of the specific wavelength detected by the photo diode 31 stops, the control unit 7 of the photo amplifying apparatus shown in FIG. 8 fails to properly control the photo amplifying apparatus.

Fourth Embodiment

Figure 14:
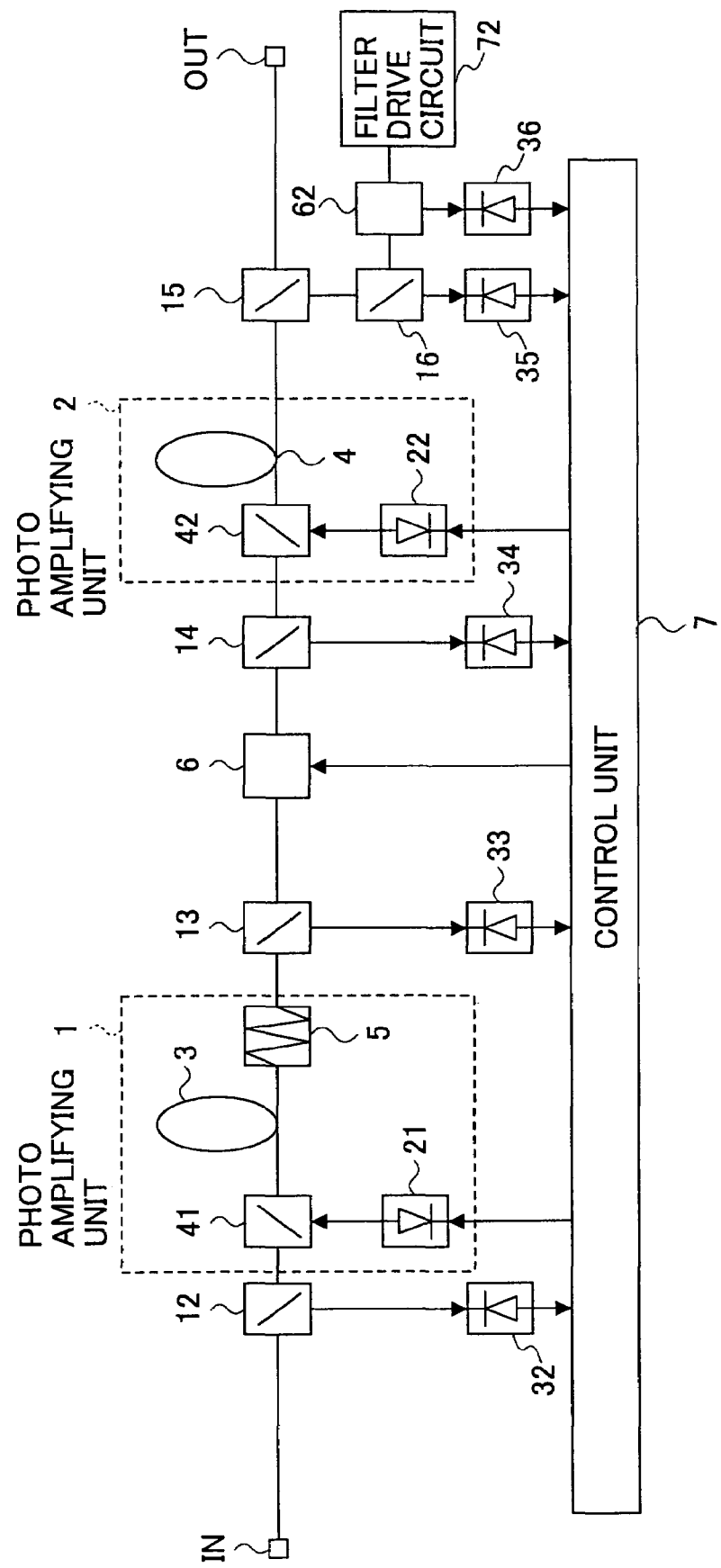
FIG. 14 is a schematic diagram showing a photo amplifying apparatus according to the fourth embodiment of the present invention.

FIG. 14 is a schematic diagram showing a photo amplifying apparatus according to the fourth embodiment of the present invention.

Figure 10:
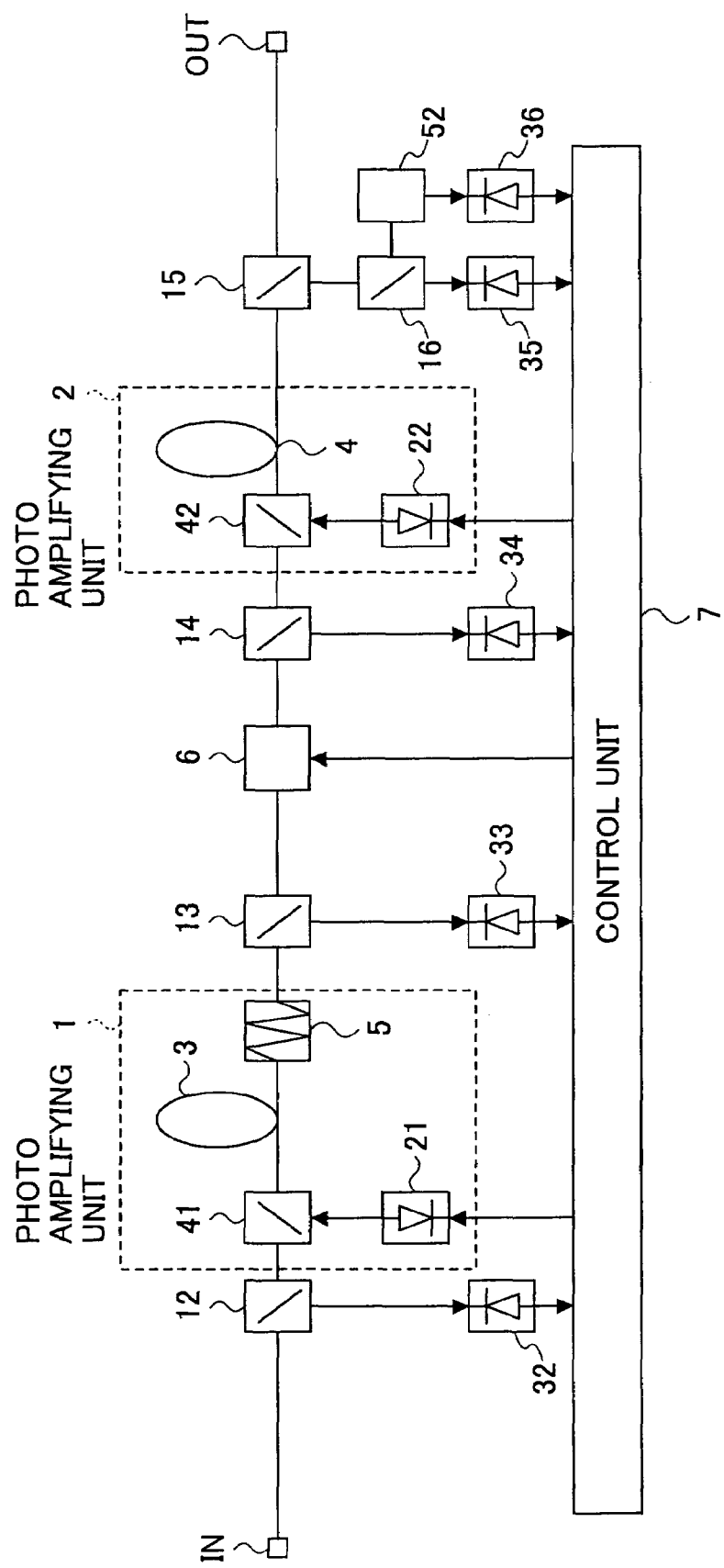
FIG. 10 is a schematic diagram showing a photo amplifying apparatus according to the second embodiment of the present invention.

The photo amplifying apparatus shown in FIG. 14 is different from the photo amplifying apparatus shown in FIG. 10 in that fixed optical filter 52 that transmits a specific wavelength is replaced with a variable optical filter 62 that transmits a variable wavelength, and a drive circuit 72 for controlling the variable optical filter 62 is added. Accordingly, even if the photo signal of the specific wavelength detected by the photo diode 36 stops due to a malfunction, for example, the variable optical filter 62 can select an alternative wavelength and continue to monitor the photo signal of the alternative wavelength.

The photo amplifying apparatus according to the fourth embodiment operates in the same manner as the photo amplifying apparatus according to the second embodiment except that, even if the photo signal of the specific wavelength stops, the control unit 7 causes the filter drive circuit 72 to switch the stopped wavelength to another wavelength and continues to properly control.

Fifth Embodiment

Figure 15:
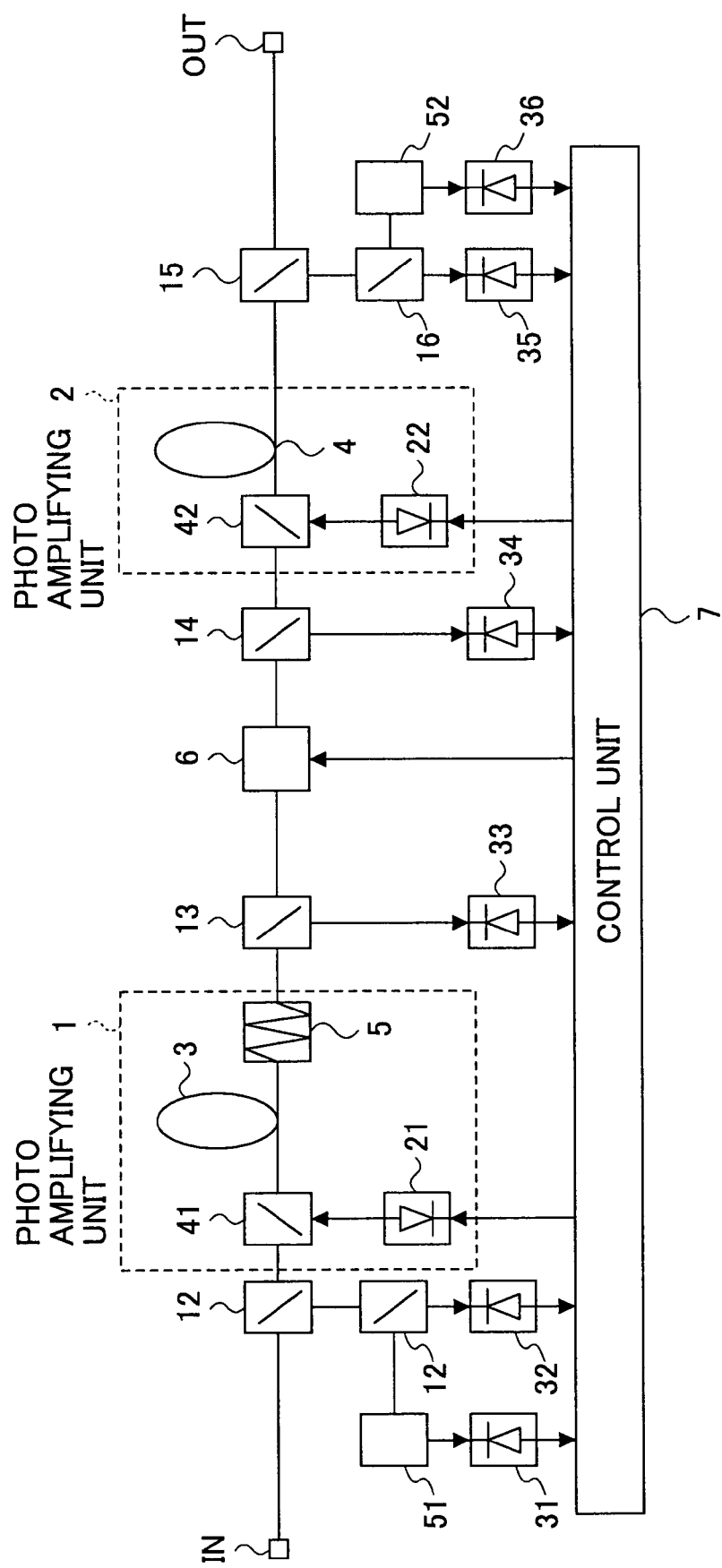
FIG. 15 is a schematic diagram showing a photo amplifying apparatus according to the fifth embodiment of the present invention.

FIG. 15 is a schematic diagram showing a photo amplifying apparatus according to the fifth embodiment of the present invention.

The fifth embodiment is the combination of the first embodiment and the second embodiment.

Compared with the photo amplifying apparatuses shown in FIGS. 8 and 10, the photo amplifying apparatus shown in FIG. 15 is different in that it is provided with both fixed optical filters 51 and 52 and both photo diodes 31 and 36.

As described with reference to FIG. 15, since the photo amplifying apparatus is provided with the fixed optical filter 51 and the photo diode 31, the photo amplifying apparatus can determine the number of wavelengths as soon as the number of wavelengths changes. Using the determined number of wavelengths, the photo amplifying apparatus can make the gain thereof flat.

Sixth Embodiment

Figure 16:
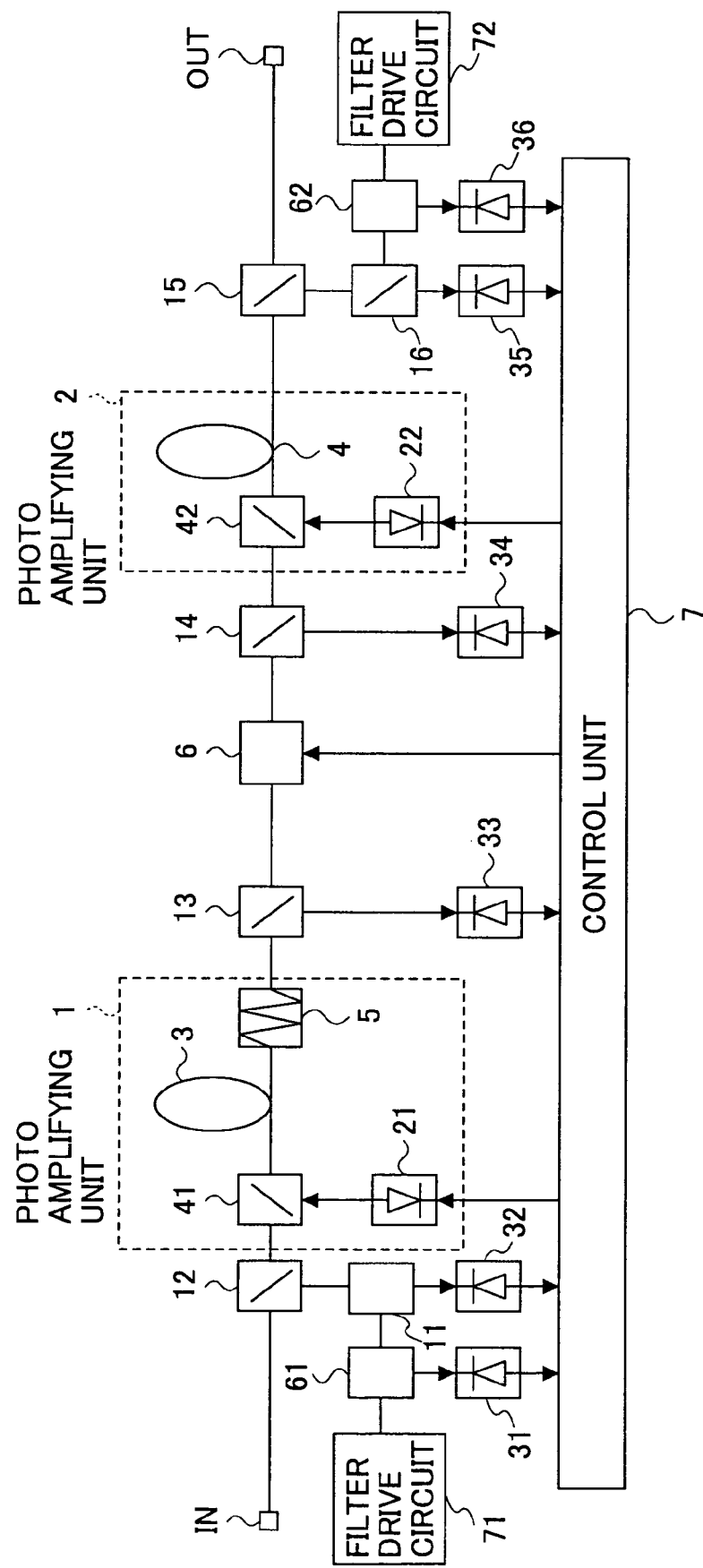
FIG. 16 is a schematic diagram showing a photo amplifying apparatus according to the sixth embodiment of the present invention.

FIG. 16 is a schematic diagram showing a photo amplifying apparatus according to the sixth embodiment.

The sixth embodiment is the combination of the third embodiment and the fourth embodiment. The photo amplifying apparatus shown in FIG. 16 is different from the photo amplifying apparatus shown in FIG. 15 in that the fixed optical filters 51 and 52 are replaced with variable optical filters 61 and 62, and drive circuits 71 and 72 are added. The drive circuits 71 and 72 control the variable optical filters 61 and 62, respectively, so that the variable optical filters 61 and 62 transmit photo signals of which the wavelength is variably determined by the control unit 7. Accordingly, the control unit 7 of the photo amplifying apparatus shown in FIG. 16 can arbitrarily determine the wavelength of the photo signals that transmit the variable optical filters 61 and 62.

The photo amplifying apparatus according to the sixth embodiment shown in FIG. 16 operates basically in the same manner as the photo amplifying apparatus according to the fifth embodiment shown in FIG. 15. If the photo signal of the wavelength that is monitored by the photo diodes 31 and 36 stops due to a malfunction, for example, the control unit 7 of the photo amplifying apparatus according to the fifth embodiment can no longer be properly controlled by the photo amplifying apparatus. However, the control unit 7 of the photo amplifying apparatus according to the sixth embodiment can continuously control the photo amplifying apparatus according to the sixth embodiment by switching the monitored wavelength to another wavelength. Accordingly, the control unit 7 can continue to properly control the photo amplifying apparatus.

As described above, according to the present invention, the photo amplifying apparatus controls output signal level by detecting, based on the change in photo signals, changes in the number of the wavelengths and gain gradient of the photo signals.

The present invention is not limited to these embodiments, but variations and modifications may be made without departing from the scope of the present invention.

This patent application is based on Japanese priority patent application No. 2002-264261 filed on Sep. 10, 2002, the entire contents of which are hereby incorporated by reference.

What is claimed is:

1. An optical amplifying apparatus for amplifying wavelength division multiplexed signals, comprising:
    an optical amplifying unit amplifying an input light;
    an input branching unit branching the input light;
    an optical filter passing a specific wavelength of the branched light;
    a specific wavelength measuring unit measuring a power of filtered light;
    a total power measuring unit measuring a total light power of the branched light; and
    a control unit controlling the optical amplifying unit based on the power of the filtered light and the total light power measured by the specific wavelength measuring unit and the total power measuring unit, respectively,
    wherein the control unit determines whether a change of the output light is caused by a loss of transmission path or a change in wavelength number by comparing a first change of the power of the filtered light with a second change of the total light power.

2. The optical amplifying apparatus as claimed in claim 1, wherein said specific wavelength measuring unit further comprises a variable-wavelength optical filter.

3. The optical amplifying apparatus as claimed in claim 1, wherein
    said control unit, when the light power measured by said specific wavelength measuring unit does not change and the total light power measured by said total power measuring unit changes, determines the number of multiplexed wavelengths of said optical signals based on the light power measured by said specific wavelength measuring unit and the total light power measured by said total power measuring unit.

4. The optical amplifying apparatus as claimed in claim 1, wherein said control unit, when change in the light power measured by said specific wavelength measuring unit is equal to change in the total light power measured by said total power measuring unit, controls the input of said amplifying apparatus based on the light power measured by said specific wavelength measuring unit and the total light power measured by said total power measuring unit so as to compensate for the loss of optical transmission path.

5. The optical amplifying apparatus as claimed in claim 1, wherein
said measuring point is positioned at an output stage; and
said control unit controls the input of said optical amplifying apparatus based on the number of multiplexed wavelengths, the light power measured by said specific wavelength measuring unit, and the total light power measured by said total power measuring unit so as to compensate a gain gradient of input optical signals.

6. An optical amplifying apparatus for amplifying wavelength division multiplexed signals, comprising:
an optical amplifying unit amplifying an output light;
an output branching unit branching the output light;
an optical filter passing a specific wavelength of the branched light;
a specific wavelength measuring unit measuring a power of filtered light;
a total power measuring unit measuring a total light power of the branched light; and
a control unit controlling the optical amplifying unit based on the power of the filtered light and the total light power measured by the specific wavelength measuring unit and the total power measuring unit, respectively,
wherein the control unit determines whether a change in output light is caused by a loss of transmission path or a change in wavelength number by comparing a first change of the power of the filtered light with a second change of the total light power.

7. The optical amplifying apparatus as claimed in claim 6, wherein said specific wavelength measuring unit further comprises a variable-wavelength optical filter.

8. The optical amplifying apparatus as claimed in claim 6, wherein
said control unit, when the light power measured by said specific wavelength measuring unit does not change and the total light power measured by said total power measuring unit changes, determines the number of multiplexed wavelengths of said optical signals based on the light power measured by said specific wavelength measuring unit and the total light power measured by said total power measuring unit.

9. The optical amplifying apparatus as claimed in claim 6, wherein said control unit, when change in the light power measured by said specific wavelength measuring unit is equal to change in the total light power measured by said total power measuring unit, controls the output of said amplifying apparatus based on the light power measured by said specific wavelength measuring unit and the total light power measured by said total power measuring unit so as to compensate for the loss of optical transmission path.

10. The optical amplifying apparatus as claimed in claim 6, wherein
said measuring point is positioned at an output stage; and
said control unit controls the output of said optical amplifying apparatus based on the number of multiplexed wavelengths, the light power measured by said specific wavelength measuring unit, and the total light power measured by said total power measuring unit so as to compensate a gain gradient of output optical signals.

11. An optical amplifying apparatus for amplifying wavelength division multiplexed signals, comprising:
a first optical amplifying unit amplifying an input light;
a second optical amplifying unit amplifying light outputted by the first optical amplifying unit;
a first input branching unit branching the input light;
a second output branching unit branching an output light of the second optical amplifying unit;
a first optical filter passing a specific wavelength of the branched input light;
a second optical filter passing a specific wavelength of the branched output light;
a first specific wavelength measuring unit measuring a power of filtered input light;
a second specific wavelength measuring unit measuring a power of filtered output light;
a first total power measuring unit measuring a total input light power of the branched input light;
a second total power measuring unit measuring a total output light power of the branched output light; and
a control unit controlling the optical amplifying units based on the power of filtered input light, the power of filtered output light, the total light power of the branched input light, and a total light power of the branched output light measured by the first and second specific wavelength measuring units and the first and second total power measuring units,
wherein the control unit determines whether a change of the output light is caused by a loss of transmission path or a change in wavelength number in the first or the second amplifier, by comparing a first change of the power of the filtered input light with a second change of the total input light power, and a third change of the power of the filtered output light with a fourth change of the total output power.

12. The optical amplifying apparatus as claimed in claim 11, wherein said specific wavelength measuring units further comprises variable-wavelength optical filters.

13. The optical amplifying apparatus as claimed in claim 11, wherein
said control unit, when the light power measured by said specific wavelength measuring units does not change and the total light power measured by said total power measuring unit changes, determines the number of multiplexed wavelengths of said optical signals based on the light power measured by said specific wavelength measuring units and the total light power measured by said total power measuring unit.

14. The optical amplifying apparatus as claimed in claim 11, wherein said control unit, when change in the light power measured by said specific wavelength measuring unit is equal to change in the total light power measured by said total power measuring unit, controls the input and output of said amplifying apparatuses based on the light power measured by said specific wavelength measuring units and the total light power measured by said total power measuring unit so as to compensate for the toss of optical transmission path.

15. The optical amplifying apparatus as claimed in claim 11, wherein
said measuring point is positioned at an output stage; and
said control unit controls the output of said optical amplifying apparatus based on the number of multiplexed wavelengths, the light power measured by said specific wavelength measuring units, and the total light power measured by said total power measuring unit so as to compensate a gain gradient of output optical signals and input optical signals.

16. An optical amplifying apparatus for amplifying wavelength division multiplexed signals, comprising:
a power measuring unit measuring a total light power of branched light which is branched from the wavelength division multiplexed signals, and light power of the branched light corresponding to a predefined wavelength range; and a control unit controlling an optical amplifying unit based on the light power of branched light corresponding to the predefined wavelength range, and the total light power of the branched light, wherein the control unit determines whether a change of output light is caused by a loss of transmission path or a change in wavelength number by comparing a first change of the light power of branched light corresponding to the predefined wavelength range with a second change of the total light power.

* * * * *

UNITED STATES PATENT AND TRADEMARK OFFICE
CERTIFICATE OF CORRECTION

| | | |
|---|---|---|
| PATENT NO. | : 7,612,936 B2 | Page 1 of 1 |
| APPLICATION NO. | : 10/639467 | |
| DATED | : November 3, 2009 | |
| INVENTOR(S) | : Kaoru Usui et al. | |

It is certified that error appears in the above-identified patent and that said Letters Patent is hereby corrected as shown below:

Column 14, Line 49, change "toss" to --loss--.

Signed and Sealed this

Nineteenth Day of January, 2010

David J. Kappos
*Director of the United States Patent and Trademark Office*